US006013346A

United States Patent [19]

Lewis et al.

[11] Patent Number: 6,013,346

[45] Date of Patent: Jan. 11, 2000

[54] DISPLAY STICKER WITH INTEGRAL FLASHER CIRCUIT AND POWER SOURCE

[75] Inventors: Edward D. Lewis, Danville, Ind.; Raymond W. Leung, Fremont, Calif.

[73] Assignee: Buztronics, Inc., Indianapolis, Ind.

[21] Appl. No.: 08/789,249

[22] Filed: Jan. 28, 1997

[51] Int. Cl.[7] .............................. B32B 3/00; B32B 31/00; G09F 19/00

[52] U.S. Cl. .......................... 428/78; 428/41.8; 428/42.1; 428/195; 428/343; 428/352; 428/542.2; 428/901; 428/917; 40/442; 40/638; 40/902; 362/103; 156/60; 156/250

[58] Field of Search ................................ 428/195, 477.1, 428/192, 204, 788.1, 913, 914, 78, 690, 901, 917, 542.2, 41.8, 42.1, 343, 352; 362/108, 103; 313/500, 511; 40/442, 444, 455, 544, 124.02, 124.03, 638, 902; 156/60, 250

[56] References Cited

U.S. PATENT DOCUMENTS

| | | | |
|---|---|---|---|
| 4,164,008 | 8/1979 | Miller et al. | 362/103 |
| 4,215,388 | 7/1980 | Reimann | 362/104 |
| 4,308,572 | 12/1981 | Davidson et al. | 362/103 |
| 4,367,515 | 1/1983 | Beard | 362/103 |
| 4,709,307 | 11/1987 | Branom | 362/103 |
| 4,774,434 | 9/1988 | Bennion | 313/500 |
| 4,823,240 | 4/1989 | Shenker | 362/103 |
| 4,962,602 | 10/1990 | Meyrowitsch | 40/541 |
| 5,113,325 | 5/1992 | Eisenbraun | 362/103 |
| 5,193,895 | 3/1993 | Naruke et al. | 362/80 |
| 5,336,977 | 8/1994 | Li | 315/159 |
| 5,371,657 | 12/1994 | Wiscombe | 362/103 |
| 5,375,044 | 12/1994 | Guritz | 362/104 |
| 5,434,759 | 7/1995 | Endo et al. | 362/108 |
| 5,440,461 | 8/1995 | Nadel et al. | 362/103 |
| 5,455,749 | 10/1995 | Ferber | 362/103 |
| 5,497,140 | 3/1996 | Tuttle | 342/51 |
| 5,531,601 | 7/1996 | Amoroso | 439/37 |
| 5,566,384 | 10/1996 | Chien | 362/84 |

FOREIGN PATENT DOCUMENTS 669 893 A5 4/1989 Switzerland .

OTHER PUBLICATIONS

The Power Within, Product Selector catalog, Energizer Power Systems, 6 pages, Oct. 1995.

*Primary Examiner*—Marie Yamnitzky
*Attorney, Agent, or Firm*—Woodard, Emhardt, Naughton, Moriarty & McNett

[57] ABSTRACT

A display sticker with integral LED flasher circuit and power source adapted to be adhesively affixed to and readily removed from a fabric article. A printed circuit board having an LED, a control circuit and a battery is adhesively affixed to the back surface of a thin flexible sheet having printed indicia on its front surface. A rubber-based, pressure-sensitive adhesive is provided on the back surface of the flexible sheet to adhere the circuit board thereto, and also to adhere the sticker assembly to a fabric article such as an article of clothing.

50 Claims, 2 Drawing Sheets

DISPLAY STICKER WITH INTEGRAL FLASHER CIRCUIT AND POWER SOURCE

BACKGROUND OF THE INVENTION

This invention relates generally to display devices, and particularly to lightweight display devices designed to be removably affixed to various fabric articles such as articles of clothing.

Many types of displays are known and extensively used, including promotional, ornamental, informational, inspirational and warning displays, among others. Stickers are a well known type of lightweight display device that can be readily adhered to a supporting surface for static display of printed text and/or graphics. However, there has not heretofore been a self-contained sticker with an electronically controlled dynamic display, that is, a display with changing characteristics such as light or sound effects that attract the attention of a desired observer.

U.S. Pat. No. 4,962,602 to Meyerowitsch discloses a sticker for an alarm system having an LED that flashes under control of an integrated circuit included as part of the sticker along with the LED. However, the sticker requires an external power source, and is provided with electrical wires for that purpose that are longer than the sticker itself. U.S. Pat. No. 5,497,140 to Tuttle discloses a postage stamp or mailing label having an integrated circuit transceiver and an associated battery cell mounted therein. Tuttle mentions, but does not describe, LEDs or laser diodes for the propagation of light signals to an interrogator. However, no such propagation occurs without a separate interrogation unit. Moreover, there is no indication that the electro-optical coupling technique suggested by Tuttle would or should be capable of generating humanly perceptible light or flashing action.

Lighted displays have been proposed for various articles of clothing as a way to enhance aesthetic appeal, which is a fundamental goal of fashion design. Examples of such displays are found in the following patents:

| Pat. No. | Inventor | Issue Date |
|---|---|---|
| 4,164,008 | Miller et al. | Aug. 7, 1979 |
| 4,308,572 | Davidson et al. | Dec. 29, 1981 |
| 4,709,307 | Branom | Nov. 24, 1987 |
| 4,774,434 | Bennion | Sep. 27, 1988 |
| 4,823,240 | Shenker | Apr. 18, 1989 |
| 5,371,657 | Wiscombe | Dec. 6, 1994 |
| 5,440,461 | Nadel et al. | Aug. 8, 1995 |
| 5,455,749 | Ferber | Oct. 3, 1995 |

However, such displays are designed either to be permanently affixed to an article of clothing, or to have different parts of the display located in different places in the article of clothing, or both. Typically, there is a requirement for holes in the fabric or other modification of the clothing itself. For example, in the devices disclosed in the above-referenced patents to Miller, Davidson and Shenker, holes are provided to allow LEDs to protrude through the fabric, and a control circuit, battery, and electrical wiring are located within a pocket or other portion of the garment. Miller teaches the use of a heat-sensitive adhesive for permanently connecting a flexible printed circuit sheet to a garment, and VELCRO® or snaps for temporary connection thereof. Ferber discloses the use of VELCRO® for connection of a battery and control circuit to a set of LEDs which are removably connected to electrically conductive lines printed, screened, painted or coated on or molded into a garment.

Bennion discloses a lighted display with LEDs mounted on a flexible circuit board that is permanently affixed to the surface of a shirt by means of a temperature-sensitive adhesive. A battery pack for the circuit board is carried in a pocket of the shirt and electrically connected to the circuit board by electrical wiring and a snap-terminal arrangement with prongs that puncture the shirt material. Branom discloses an LED flasher circuit on an overlay or patch secured to the back of a jacket or exercise vest by adhesive or sewing or the like, with a battery removably disposed in a pocket of the garment.

Readily removable, adhesively affixed name tags suitable for use on clothing are widely available, but such tags have heretofore been available only with static displays. There remains a need for a simple, inexpensive, self-contained sticker with an electronically controlled, dynamic display capable of being readily affixed to and readily removed from an article of clothing or other fabric article, and having minimal weight, thickness, and stiffness.

SUMMARY OF THE INVENTION

The present invention meets these needs and offers other advantages with a display sticker with an integral flasher and power source adapted to be adhesively affixed to but readily removed from an article of clothing or other fabric article. A thin flexible sheet has a pressure-sensitive adhesive applied to its back surface, on which is mounted a printed circuit board having integrally mounted thereon an LED, a control circuit to energize the LED to flash at a humanly perceptible rate to attract attention to indicia printed ion the front surface of the sticker, and a battery. The LED is visible through a portion of the flexible sheet. The adhesive has a tacky surface enabling the sticker to be readily affixed to fabric and yet readily removed therefrom, i.e., without substantial force and without damage to the fabric such as by removing portions thereof or leaving adhesive residue thereon.

It is an object of the present invention to provide enhanced eye-catching or otherwise attention-getting characteristics beyond those attainable with conventional printed stickers.

Another object is to provide a self-contained display sticker that may be attached to a garment without causing noticeable sag in the garment or producing a noticeable bulge on the surface of the garment or sticker.

A further object is to provide a compact flasher circuit and power source on a sticker.

Yet another object is to attract greater attention to a sticker with a minimum of additional parts, weight and thickness.

Still another object is to maintain design and manufacturing simplicity, low cost, and ease and comfort of use while providing a sticker with dynamic display capabilities.

These and other objects and advantages of the present invention will be more apparent upon reading the following detailed description in conjunction with the accompanying drawings.

DETAILED DESCRIPTION OF THE PREFERRED EMBODIMENT

Figure 1:
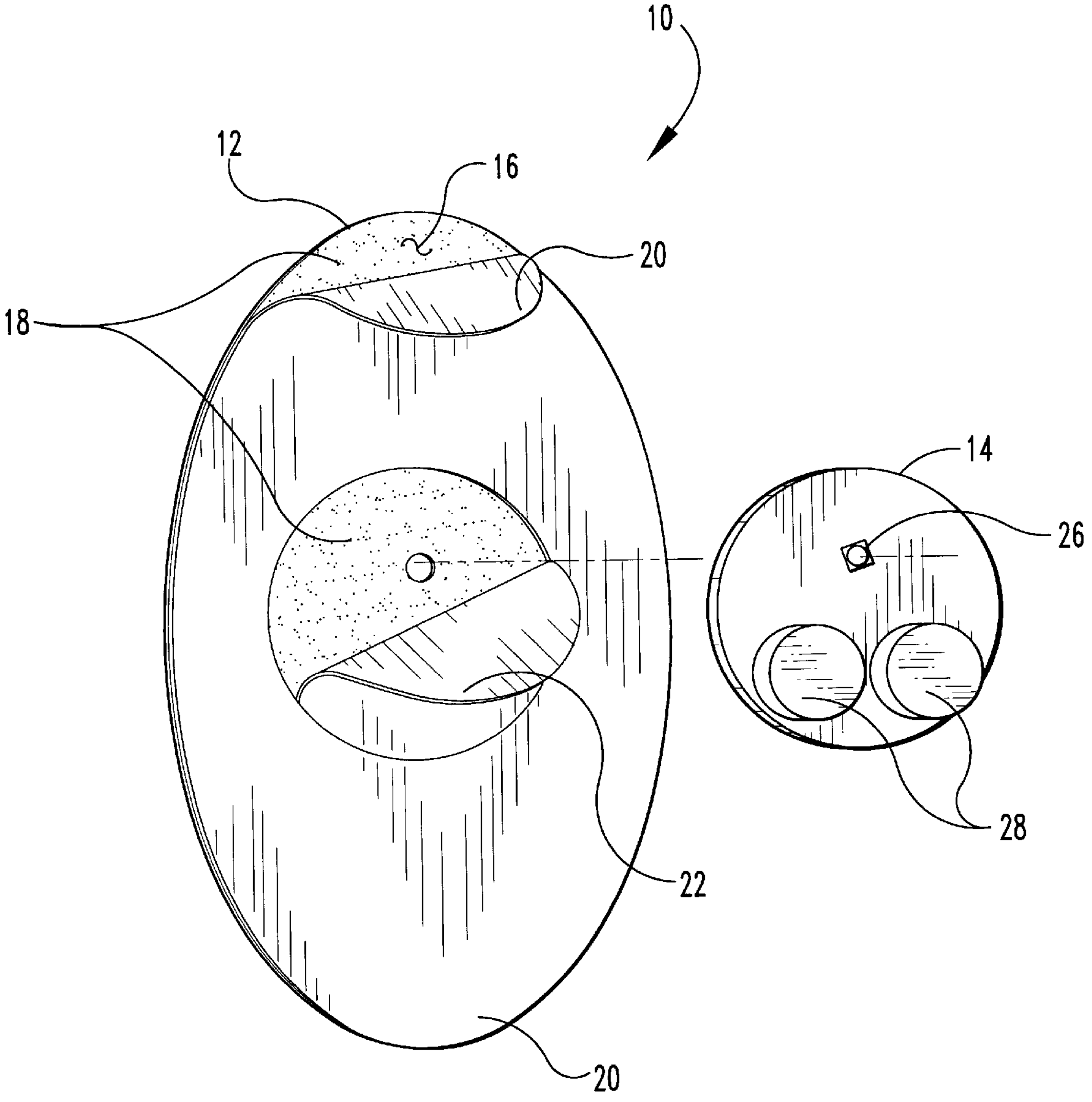
FIG. 1 is an exploded rear view of the preferred embodiment of a display sticker according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIG. 1 shows an exploded rear view of a display sticker 10 according to the present invention. A thin flexible sheet 12 has a printed circuit board 14 adhesively affixed to its back surface 16 by a layer of adhesive 18 which preferably covers the entire back surface of the flexible sheet. The front surface of the sticker may have printed thereon a product or company name, slogan or design, or other advertising indicia or indicia of other types.

The sticker is preferably provided with a peel-off backing 20 which covers the portion of adhesive layer 18 around the area occupied by the circuit board. A second peel-off backing 22 may be provided to cover the circuit board area before the circuit board is affixed to the sticker, if desired. The sticker preferably includes a pre-punched hole 24 through the flexible sheet 12 for an LED 26. The front surface of the circuit board is flat and free of components except for an LED and is affixed to the back surface of sheet 12 in the area exposed after removal of backing 22. LED 26 protrudes through hole 24 when the circuit board is affixed to sheet 12.

A suitable material for flexible sheet 12 is 60# white high gloss paper, and a 40# release liner is suitable for backing sheets 20 and 22. Such materials are commercially available from Brown-Bridge Industries of Troy, Ohio. Brown-Bridge B-82 rubber-based, pressure-sensitive adhesive is suitable for adhesive layer 18.

The printed circuit board may have a diameter of approximately 1", and a maximum height of approximately ⅛" which is defined by the height of a battery or batteries 28. In an alternative embodiment having a lithium battery described later, the circuit board has a diameter of approximately 1.5" and a maximum height of approximately 3⁄16". As can be seen in FIG. 1, the entire circuit board is small in relation to the height and width of sheet 12, and is positioned near the center thereof so as to be spaced apart from the periphery thereof. So constructed the display sticker may be placed on an exposed surface of a shirt, sweater, dress, jacket or other fabric article without producing a noticeable bulge in the fabric surface or the surface of flexible sheet 12. The circuit board is also sufficiently lightweight as to avoid causing any noticeable sag in the surface of a garment to which it is attached.

Figure 2:
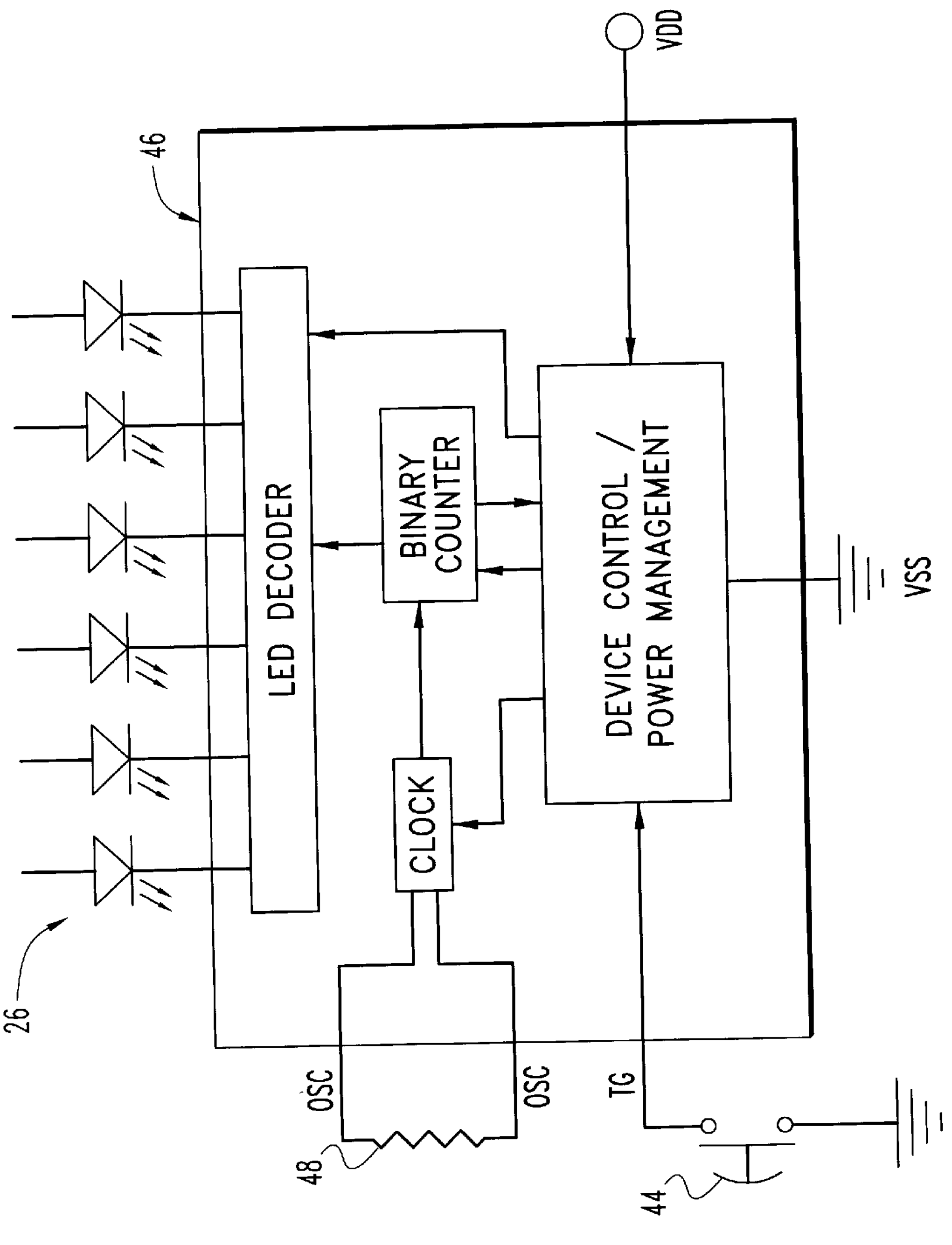
FIG. 2 is a block diagram of a control circuit and an alternate LED arrangement for the display sticker of FIG. 1.

Referring now to FIG. 2, the control circuit may have one LED as depicted on printed circuit board 14 in FIG. 1, or may have multiple LEDs driven by an LED decoder which is suitably included in a signal generator IC 46 along with a clock, a binary counter and a device control and power management circuit interconnected as shown in the drawing. A pushbutton membrane switch 44 is provided on the printed circuit board adjacent to the IC to trigger the IC into an active state in which it energizes the LED to flash at a predetermined humanly perceptible rate. The circuit is preferably designed to operate at a flashing rate of about 100 msec. or more between flashes. Preferably the LED is a high-brightness LED, whereby a flash duration of approximately 3 msec. or less is sufficient to generate enough light to attract attention from a reasonable distance.

IC 46 is preferably a monolithic CMOS integrated circuit with a on-chip capacitor in the clock circuit, and is fabricated according to well known techniques. The device control circuit provides a battery-saving sleep state for the IC. The device control circuit is continually supplied with power via the VDD input connected to the battery, but it controllably supplies power to the other circuit blocks, which, like the device control circuit, incorporate CMOS technology. Consequently, the device control circuit enables the IC to draw 1 $\mu$A or less of battery current when the IC is in its dormant or sleep state, during which the supply of power to the clock, counter and decoder is switched off by the device control circuit.

The device control circuit is suitably a flip-flop which is set in response to a first closure of the membrane switch, whereupon the device control circuit goes into the active state and supplies battery power to all of the circuit blocks of the IC. The clock then begins oscillation at a frequency determined by the RC time constant of the external resistor 48 and the internal on-chip capacitor. This clock frequency then drives the binary counter which, in turn, drives the LED decoder. The decoder converts binary data from the counter into an LED firing signal at a preset duty cycle. If LEDs are connected to more than one output of the decoder, the decoder converts binary data from the counter into a sequential firing of the LED outputs at the same duty cycle. The device control flip-flop is reset in response to a second closure of the membrane switch and thereby switches the IC back into the sleep state. IC 46 is preferably supplied in die form and wire bonded onto the circuit board.

The circuit board as shown in FIG. 1 has a pair of 1.5V alkaline manganese dioxide button cell batteries mounted thereon in series so as to provide a 3V DC source. Each battery preferably has a capacity of 20–50 mA-hrs. Alternatively, a 3V lithium manganese dioxide coin cell with 200 mA-hr capacity may be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, if added flexibility is desired, the circuitry may be mounted on a flexible printed circuit board instead of a rigid circuit board. Also, a sound source may be employed as an indicator in place of an LED or other light source.

We claim:

1. A self-contained display sticker with an electronically controlled dynamic display, comprising:

a flexible sheet of paper having front and back surfaces and printed indicia on said front surface;

adhesive means applied to said back surface of said flexible sheet for removably adhesively fixing said sticker to a mounting surface;

a dynamic indicator; and a printed circuit board smaller in surface area than said flexible sheet mounted on the back surface of said flexible sheet, said printed circuit board having integrally mounted thereon control circuit means for energizing said dynamic indicator to operate in a humanly perceptible manner, and a battery electrically connected to said control circuit means.

2. The self-contained display sticker of claim 1, wherein said dynamic indicator is integrally mounted on said printed circuit board.

3. A self-contained display sticker with an electronically controlled dynamic display, comprising:

a flexible sheet of paper having front and back surfaces and printed indicia on said front surface;

an adhesive applied to said back surface of said flexible sheet;

a dynamic indicator; and a printed circuit board smaller in surface area than said flexible sheet mounted on the back surface of said flexible sheet, said printed circuit board having integrally mounted thereon a signal generator IC having an output connected to said dynamic indicator, and a battery electrically connected to said signal generator IC.

4. The self-contained display sticker of claim 3, wherein said dynamic indicator is integrally mounted on said printed circuit board.

5. The self-contained display sticker of claim 4, further comprising a switch integrally mounted on said printed circuit board and electrically connected to said signal generator IC.

6. The self-contained display sticker of claim 5, wherein said printed circuit board has front and back surfaces and said signal generator IC, battery, and switch are integrally mounted on said back surface of said printed circuit board, and wherein said front surface of said printed circuit board is affixed to the back surface of said flexible sheet.

7. The self-contained display sticker of claim 6, wherein said flexible sheet includes a pre-punched hole therethrough, and wherein said indicator is an LED protruding through said hole.

8. The self-contained display sticker of claim 7, wherein said printed circuit board is positioned near the center of said flexible sheet so as to be spaced apart from the periphery thereof.

9. The self-contained display sticker of claim 4, wherein said adhesive is a pressure-sensitive adhesive having a tacky surface enabling said sticker to be readily affixed to and readily removed from a fabric article, wherein said indicator is an LED which is visible through a portion of said flexible sheet, and wherein said signal generator IC includes means for energizing said LED to flash at a humanly perceptible rate.

10. A method of attracting attention to a display sticker bearing printed indicia on a front surface thereof and adhesive means applied to a back surface thereof for removably adhesively affixing said sticker to a mounting surface, comprising:

integrally mounting on a printed circuit board smaller in surface area than said sticker a control circuit means for energizing a dynamic indicator to operate in a humanly perceptible manner to attract attention to said printed indicia on said front surface of said display sticker, and a battery power source with a capacity in the range of 20–200 mA-hr electrically connected to said control circuit means as the sole power source for said control circuit means and said dynamic indicator; and adhesively affixing said printed circuit board with said integrally mounted control circuit means and battery power source to said back surface of said display sticker, thereby producing a self-contained, electronically controlled, dynamic display sticker.

11. The method of claim 10, further comprising integrally mounting a pushbutton switch on said printed circuit board and electrically connecting said pushbutton switch to said control circuit means to control the energization thereof.

12. The method of claim 11, wherein said switch is a membrane switch.

13. The method of claim 12, wherein said printed circuit board has front and back surfaces and said control circuit means, battery power source, and pushbutton switch are integrally mounted on said back surface of said printed circuit board.

14. The method of claim 13, further comprising punching a hole through said sticker, providing an LED as said dynamic indicator, and mounting said printed circuit board such that said LED protrudes through said hole in said sticker.

15. The method of claim 14, further comprising energizing said LED with said control circuit means at a rate of at most about 10 flashes per second and for a duration of less than 5 msec. per flash.

16. The method of claim 15, further comprising providing said control circuit means with a sleep state during which it draws 1 $\mu$A or less of current.

17. The method of claim 16, wherein said printed circuit board is positioned near the center of said sticker so as to be spaced apart from the periphery thereof.

18. The method of claim 10, wherein said dynamic indicator is integrally mounted on said printed circuit board.

19. The method of claim 10, wherein said dynamic indicator is a single light-emitting element.

20. The method of claim 19, wherein said battery capacity is in the range of 20–50 mA-hr.

21. A self-contained display sticker with an electronically controlled dynamic display, comprising:

a flexible sheet having front and back surfaces and printed indicia on said front surface;

an adhesive applied to said back surface of said flexible sheet;

a dynamic indicator; and a printed circuit board smaller in surface area than said flexible sheet mounted on the back surface of said flexible sheet, said printed circuit board having integrally mounted thereon a signal generator IC having an output connected to said dynamic indicator, and a battery power source with a capacity in the range of 20–200 mA-hr electrically connected to said signal generator IC as the sole power source for said IC and said dynamic indicator.

22. The self-contained display sticker of claim 21, wherein said dynamic indicator is integrally mounted on said printed circuit board.

23. The self-contained display sticker of claim 22, wherein said indicator is an LED and said signal generator IC includes means for energizing said LED to flash at a humanly perceptible rate.

24. The self-contained display sticker of claim 22, wherein said printed circuit board has a single light-emitting element integrally mounted thereon as said dynamic indicator.

25. The self-contained display sticker of claim 24, further comprising a pushbutton switch integrally mounted on said printed circuit board and electrically connected to said control circuit means.

26. The self-contained display sticker of claim 25, wherein said switch is a membrane switch.

27. The self-contained display sticker of claim 26, wherein said printed circuit board has front and back surfaces and said control circuit means, battery power source, and pushbutton switch are integrally mounted on said back surface of said printed circuit board, and wherein said front surface of said printed circuit board is affixed to the back surface of said flexible sheet.

28. The self-contained display sticker of claim 27, wherein said flexible sheet includes a pre-punched hole therethrough, and wherein said indicator is an LED protruding through said hole when said printed circuit board is mounted on said flexible sheet.

29. The self-contained display sticker of claim 28, wherein said control circuit means includes means for energizing said LED at a rate of at most about 10 flashes per second and for a duration of less than five msec. per flash.

30. The self-contained display sticker of claim 29, wherein said control circuit means includes a sleep state during which it draws 1 $\mu$A or less of current.

31. The self-contained display sticker of claim 30, wherein said printed circuit board is positioned near the center of said flexible sheet so as to be spaced apart from the periphery thereof.

32. The self-contained display sticker of claim 24, wherein said printed circuit board has front and back surfaces and said control circuit means and battery power source are integrally mounted on said back surface of said printed circuit board, and wherein said front surface of said printed circuit board is affixed to the back surface of said flexible sheet.

33. The self-contained display sticker of claim 24, wherein said flexible sheet includes a pre-punched hole therethrough, wherein said indicator is an LED protruding through said hole when said printed circuit board is mounted on said flexible sheet, and wherein said control circuit means includes means for energizing said LED at a rate of at most about 10 flashes per second and for a duration of less than five msec. per flash.

34. The self-contained display sticker of claim 24, wherein said control circuit means includes a sleep state during which it draws 1 $\mu$A or less of current.

35. The self-contained display sticker of claim 24, wherein said printed circuit board is positioned near the center of said flexible sheet so as to be spaced apart from the periphery thereof.

36. The self-contained display sticker of claim 24, wherein said battery capacity is in the range of 20–50 mA-hr.

37. The self-contained display sticker of claim 21, wherein said battery capacity is in the range of 20–50 mA-hr.

38. A method of attracting attention to a display sticker bearing printed indicia on a front surface thereof, adhesive means applied to a back surface thereof for removably adhesively affixing said sticker to a mounting surface, and a pell-off backing over said adhesive means, comprising:

providing a hole in said peel-off backing in an area spaced apart from the periphery of said display sticker;

integrally mounting on a printed circuit board smaller in surface area than said sticker a control circuit means for energizing a dynamic indicator to operate in a humanly perceptible manner to attract attention to said printed indicia on said front surface of said display sticker, and a battery electrically connected to said control circuit means; and adhesively affixing said printed circuit board with said integrally mounted control circuit means and battery to said back surface of said display sticker in said area defined by said hole, thereby producing a self-contained, electronically controlled, dynamic display sticker.

39. The method of claim 38, further comprising integrally mounting a switch on said printed circuit board and electrically connecting said switch to said control circuit means to control the energization thereof.

40. The method of claim 39, wherein said printed circuit board has front and back surfaces and said control circuit means, battery, and switch are integrally mounted on said back surface of said printed circuit board.

41. The method of claim 40, further comprising punching a hole through said sticker, providing an LED as said dynamic indicator, and mounting said printed circuit board such that said LED protrudes through said hole in said sticker.

42. The method of claim 41, wherein said printed circuit board is positioned near the center of said sticker so as to be spaced apart from the periphery thereof.

43. The method of claim 38, wherein said dynamic indicator is integrally mounted on said printed circuit board.

44. A self-contained display sticker with an electronically controlled dynamic display, comprising:

a flexible sheet having front and back surfaces and printed indicia on said front surface;

an adhesive applied to said back surface of said flexible sheet;

a dynamic indicator;

a printed circuit board smaller in surface area than said flexible sheet mounted on the back surface of said flexible sheet, said printed circuit board having integrally mounted thereon a signal generator IC having an output connected to said dynamic indicator, and a battery electrically connected to said signal generator IC; and a peel-off backing covering said adhesive on said back surface of said flexible sheet, said peel-off backing having a hole therethrough in an area spaced apart from the periphery of said flexible sheet, wherein said printed circuit board is positioned in said hole and thereby surrounded by said peel-off backing in the plane of contact between said printed circuit board and said flexible sheet.

45. The self-contained display sticker of claim 44, further comprising a switch integrally mounted on said printed circuit board and electrically connected to said signal generator IC.

46. The self-contained display sticker of claim 45, wherein said printed circuit board has front and back surfaces and said signal generator IC, battery, and switch are integrally mounted on said back surface of said printed circuit board, and wherein said front surface of said printed circuit board is affixed to the back surface of said flexible sheet.

47. The self-contained display sticker of claim 46, wherein said flexible sheet includes a pre-punched hole therethrough, and wherein said indicator is an LED protruding through said hole.

48. The self-contained display sticker of claim 47, wherein said printed circuit board is positioned near the center of said flexible sheet so as to be spaced apart from the periphery thereof.

49. The self-contained display sticker of claim 48, wherein said adhesive is a pressure-sensitive adhesive having a tacky surface enabling said sticker to be readily affixed to and readily removed from a fabric article.

50. The self-contained display sticker of claim 44, wherein said dynamic indicator is integrally mounted on said printed circuit board.

* * * * *